US012736891B2

(12) United States Patent
Jo

(10) Patent No.: US 12,736,891 B2
(45) Date of Patent: Sep. 15, 2026

(54) IMAGE FORMING APPARATUS

(71) Applicant: KYOCERA Document Solutions Inc., Osaka (JP)

(72) Inventor: Zuishin Jo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/227,029

(22) Filed: Jun. 3, 2025

(65) Prior Publication Data

US 2025/0377605 A1 Dec. 11, 2025

(30) Foreign Application Priority Data

Jun. 7, 2024 (JP) ................................ 2024-092904

(51) Int. Cl.
*G03G 15/02* (2006.01)
*G03G 5/043* (2006.01)
(Continued)

(52) U.S. Cl.
CPC ......... *G03G 15/0233* (2013.01); *G03G 5/043* (2013.01); *G03G 5/0637* (2013.01); (Continued)

(58) Field of Classification Search
CPC .. G03G 5/043; G03G 5/0637; G03G 15/0233; G03G 15/75; G03G 15/751; G03G 15/752; G03G 2215/025
See application file for complete search history.

(56) References Cited

U.S. PATENT DOCUMENTS

2008/0273897 A1* 11/2008 Ezumi .................. G03G 5/0507 399/111
2008/0305426 A1* 12/2008 Kurimoto ............ G03G 5/0696 430/125.5

(Continued)

FOREIGN PATENT DOCUMENTS

JP 2013-228652 A 11/2013

OTHER PUBLICATIONS

Extended European Search Report from the European Patent Office dated Nov. 14, 2025, issued to European Application No. 25180056.1.

*Primary Examiner* — Joseph S Wong
(74) *Attorney, Agent, or Firm* — Stein IP, LLC

(57) ABSTRACT

An image forming apparatus includes an image carrier, a charging roller, an exposure device, and a developing device. The image carrier includes a conductive substrate, an intermediate layer, and a photosensitive layer. The photosensitive layer includes an electric charge generation layer and an electric charge transport layer stacked on a surface of the electric charge generation layer, and the electric charge transport layer contains an antioxidant expressed by a general formula (1) below. In the formula (1), $R^1$ represents an alkyl group having 1 to 10 carbon atoms or a general formula (2) below in which $R^2$ represents an alkyl group having 1 to 10 carbon atoms. The charging roller has a resistance value in a range of $2\times10^5$ to $2\times10^6$[Ω] when a DC voltage of 500 V is applied thereto under an environment of 10° C. and 10% RH.

(Continued)

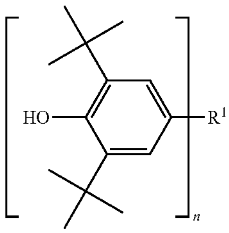

(1)

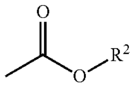

(2)

2 Claims, 3 Drawing Sheets

(51) Int. Cl.
*G03G 5/06* (2006.01)
*G03G 15/00* (2006.01)

(52) U.S. Cl.
CPC ........... *G03G 15/75* (2013.01); *G03G 15/751* (2013.01); *G03G 15/752* (2013.01); *G03G 2215/025* (2013.01)

(56) References Cited

U.S. PATENT DOCUMENTS

| | | | | |
|---|---|---|---|---|
| 2013/0236822 | A1 | 9/2013 | Ono et al. | 430/56 |
| 2017/0255113 | A1 | 9/2017 | Miyamoto et al. | G03G 5/043 |
| 2019/0094725 | A1* | 3/2019 | Sakimura | G03G 5/14734 |
| 2019/0235399 | A1 | 8/2019 | Iwashita et al. | G03G 5/047 |

* cited by examiner

IMAGE FORMING APPARATUS

INCORPORATION BY REFERENCE

This application is based upon and claims the benefit of priority from the corresponding Japanese Patent Application No. 2024-092904 filed on Jun. 7, 2024, the entire contents of which are hereby incorporated by reference.

BACKGROUND

The present disclosure relates to an image forming apparatus employing an electrophotographic method, such as a copy machine, a printer, a facsimile, or a multifunctional peripheral having functions of these apparatuses.

Conventionally, in an image forming apparatus employing the electrophotographic method, a toner image formed on a surface of an image carrier such as a photosensitive drum is transferred to a recording medium through processes of charging, exposure, development, and transfer.

Such an image forming apparatus employing the electrophotographic method has presented a problem that, under a low-temperature and low-humidity environment (around 10° C. and 10% RH), abnormal discharging might occur to cause an electrophotographic photosensitive member to be charged non-uniformly, resulting in the occurrence of streak-shaped charge unevenness.

SUMMARY

An image forming apparatus according to one aspect of the present disclosure is an image forming apparatus including an image carrier, a charging roller, an exposure device, and a developing device. The image carrier includes a conductive substrate, an intermediate layer stacked on a surface of the conductive substrate, and a photosensitive layer stacked on a surface of the intermediate layer. The charging roller receives, while being in contact with a surface of the image carrier, application of a prescribed DC voltage and thus charges the surface of the image carrier. The exposure device exposes to light the surface of the image carrier charged by the charging roller so as to form an electrostatic latent image having attenuated charge thereon. The developing device supplies toner to the image carrier so as to develop the electrostatic latent image into a toner image. The photosensitive layer includes an electric charge generation layer and an electric charge transport layer stacked on a surface of the electric charge generation layer, and the electric charge transport layer contains an antioxidant expressed by a general formula (1) below. The charging roller has a resistance value in a range of $2\times10^5$ to $2\times10^6$[Ω] when a DC voltage of 500 V is applied thereto under an environment of 10° C. and 10% RH.

(1)

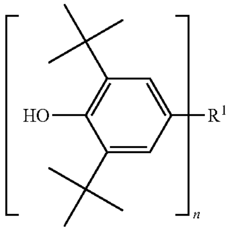

In the formula (1), $R^1$ represents an alkyl group having 1 to 10 carbon atoms or a general formula (2) below in which $R^2$ represents an alkyl group having 1 to 10 carbon atoms.

(2)

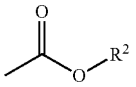

DETAILED DESCRIPTION

[1. Overall Configuration of Image Forming Apparatus]

Figure 1:
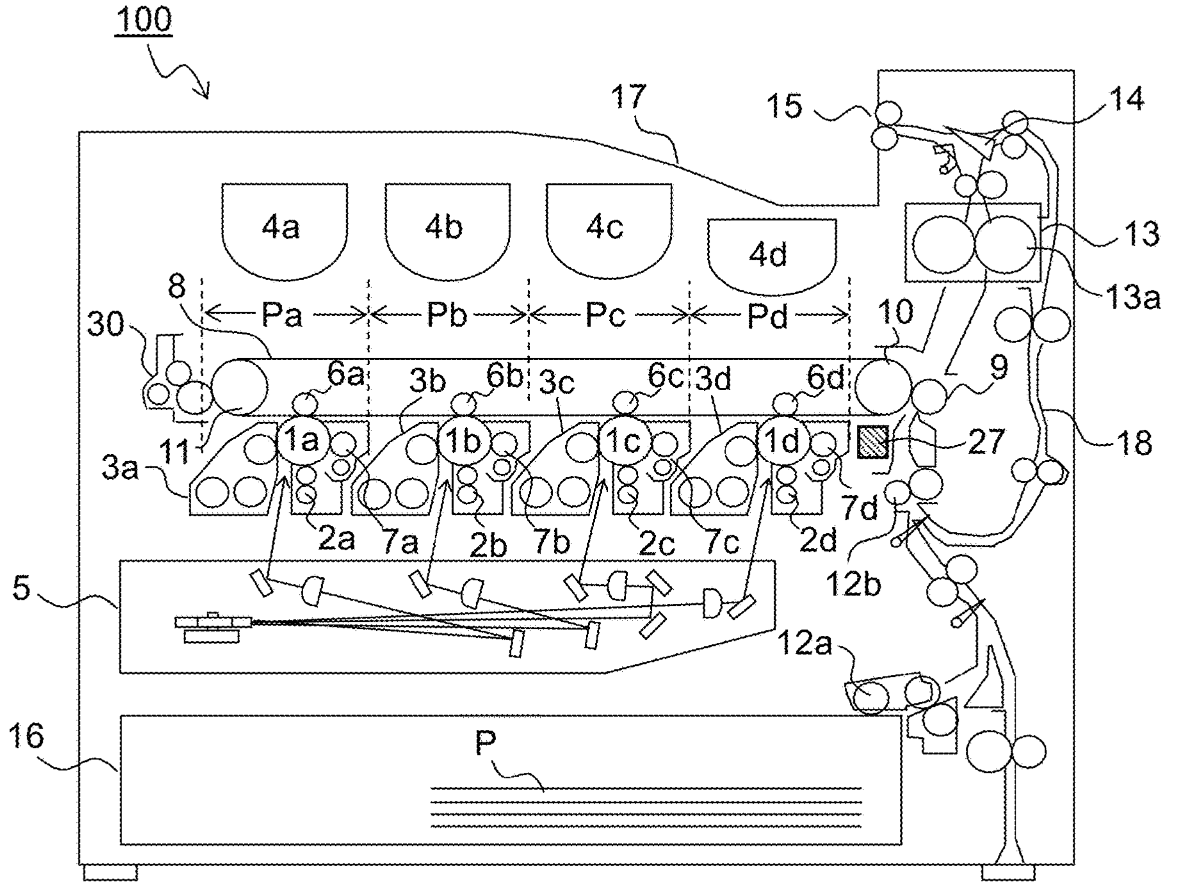
FIG. 1 is a schematic structural view of a color printer according to one embodiment of the present disclosure.
Figure 2:
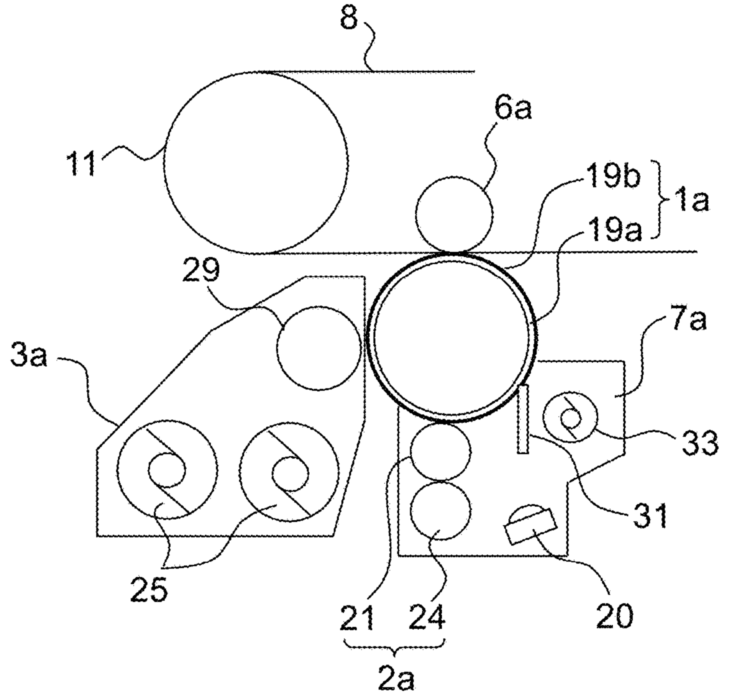
FIG. 2 is an enlarged view of and around an image forming portion in FIG. 1.

With reference to the appended drawings, the following describes an embodiment of the present disclosure. FIG. 1 is a schematic sectional view of a color printer 100 according to one embodiment of the present disclosure. FIG. 2 is an enlarged view of and around an image forming portion Pa in FIG. 1. Basically, image forming portions Pb to Pd are also similar in configuration, and duplicate descriptions thereof are, therefore, omitted.

In a main body of the color printer 100, the four image forming portions Pa, Pb, Pc, and Pd are disposed in this order from an upstream side in a conveyance direction (a left side in FIG. 1). The image forming portions Pa to Pd are provided so as to correspond to images of four different colors (yellow, magenta, cyan, and black) and sequentially form images of yellow, magenta, cyan, and black, respectively, by following steps of charging, exposure, development, and transfer.

In the image forming portions Pa to Pd, there are respectively disposed photosensitive drums 1*a*, 1*b*, 1*c*, and 1*d* that carry visible images (toner images) of the different colors. Moreover, an intermediate transfer belt 8 that rotates in a counterclockwise direction in FIG. 1 is provided adjacently to the image forming portions Pa to Pd. The intermediate transfer belt 8 is looped around a driving roller 10 on a downstream side and a tension roller 11 on an upstream side, and on an upstream side of the image forming portion Pa in a rotation direction of the intermediate transfer belt 8, a belt cleaning device 30 is arranged to be opposed to the tension roller 11 via the intermediate transfer belt 8.

As shown in FIG. 2, around the photosensitive drum 1*a*, a charging device 2*a*, a developing device 3*a*, a cleaning device 7*a*, and a static eliminating device 20 are disposed along a drum rotation direction (a clockwise direction in FIG. 2), and a primary transfer roller 6*a* is arranged to face the photosensitive drum 1*a* via the intermediate transfer belt 8.

The photosensitive drums 1*a* to 1*d* are each composed of a conductive substrate 19*a* and a photosensitive layer 19*b* formed on a surface of the conductive substrate 19*a*. A detailed configuration of the photosensitive drums 1*a* to 1*d* will be described later.

Each of the charging devices 2*a* to 2*d* includes a charging roller 21 that contacts a corresponding one of the photosensitive drums 1*a* to 1*d* so as to apply a charging voltage (a DC voltage) to a drum surface thereof and a charging cleaning roller 24 for cleaning the charging roller 21. A detailed configuration of the charging roller 21 will be described later.

Each of the developing devices 3*a* to 3*d* is of a two-component development type including two stirring conveyance screws 25 and a developing roller 29 and is filled with a prescribed amount of a two-component developer containing toner of a corresponding one of the different colors of yellow, magenta, cyan, and black and a magnetic carrier. The two-component developer is used to form a magnetic brush on a surface of the developing roller 29, and in a state where a developing voltage having the same polarity (herein, a positive polarity) as that of the toner is applied to the developing roller 29, the magnetic brush is caused to contact the surface of the photosensitive drum 1*a* so that the toner adheres thereto to form a toner image. When, through formation of toner images, a percentage of the toner in the two-component developer filled in any of the developing devices 3*a* to 3*d* falls below a preset value, the any of the developing devices 3*a* to 3*d* is replenished with a fresh supply of toner from a corresponding one of toner containers 4*a* to 4*d*.

Each of the cleaning devices 7*a* to 7*d* includes a cleaning blade 31 and a collection screw 33. The cleaning blade 31 removes residual toner or the like remaining on the surface of each of the photosensitive drums 1*a* to 1*d*. By the collection screw 33, the residual toner or the like removed by the cleaning blade 31 is ejected to outside each of the cleaning devices 7*a* to 7*d* and is collected in a waste tonner collection container (not shown). The static eliminating device 20 applies static eliminating light to the surface of each of the photosensitive drums 1*a* to 1*d* so as to eliminate residual electric charge thereon.

Upon an input of image data from a host apparatus such as a personal computer, first, a main motor 40 (see FIG. 3) starts to rotate the photosensitive drums 1*a* to 1*d*. Furthermore, a belt driving motor 41 (see FIG. 3) starts to drive the intermediate transfer belt 8 to rotate. Next, the charging devices 2*a* to 2*d* uniformly charge the surfaces of the photosensitive drums 1*a* to 1*d*, respectively, to the same polarity (here, the positive polarity) as that of the toner. Then, by the exposure device 5, light is applied in accordance with the image data so that, on the photosensitive drums 1*a* to 1*d*, electrostatic latent images having attenuated charge are formed in accordance with the image data.

By the toner containers 4*a* to 4*d*, the developing devices 3*a* to 3*d* are filled respectively with prescribed amounts of the two-component developer (also referred to simply as a developer) containing the toner of the different colors of yellow, magenta, cyan, and black, and the toner in the developer is supplied onto the photosensitive drums 1*a* to 1*d* by the developing devices 3*a* to 3*d*, respectively, so as to electrostatically adhere thereto. Thus, there are formed toner images according to the electrostatic latent images formed by exposure to light from the exposure device 5.

Further, the primary transfer rollers 6*a* to 6*d* apply an electric field of a prescribed transfer voltage between themselves and the photosensitive drums 1*a* to 1*d*, respectively, and thus the toner images of yellow, magenta, cyan, and black respectively on the photosensitive drums 1*a* to 1*d* are primarily transferred onto the intermediate transfer belt 8. Residual toner or the like remaining on the surfaces of the photosensitive drums 1*a* to 1*d* after primary transfer is removed by the cleaning devices 7*a* to 7*d*, respectively. Residual electric charge remaining on the surface of each of the photosensitive drums 1*a* to 1*d* after the primary transfer is eliminated by the static eliminating device 20.

A transfer sheet P to which the toner images are to be transferred is housed in a sheet cassette 16 arranged in a lower part in the color printer 100 and is conveyed, at prescribed timing, to a nip (a secondary transfer nip) between a secondary transfer roller 9 provided adjacently to the intermediate transfer belt 8 and the intermediate transfer belt 8 via a paper feed roller 12*a* and a registration roller pair 12*b*. The transfer sheet P to which the toner images have been secondarily transferred is conveyed to a fixing portion 13.

The transfer sheet P conveyed to the fixing portion 13 is heated and pressed by a fixing roller pair 13*a* so that the toner images are fixed to a surface of the transfer sheet P, and thus a prescribed full-color image is formed thereon. The transfer sheet P on which the full-color image has been formed is directly (or after being directed by a branch portion 14 into an inversion conveyance path 18 and thus having images formed on both sides thereof) ejected to an ejection tray 17 by an ejection roller pair 15.

Figure 3:
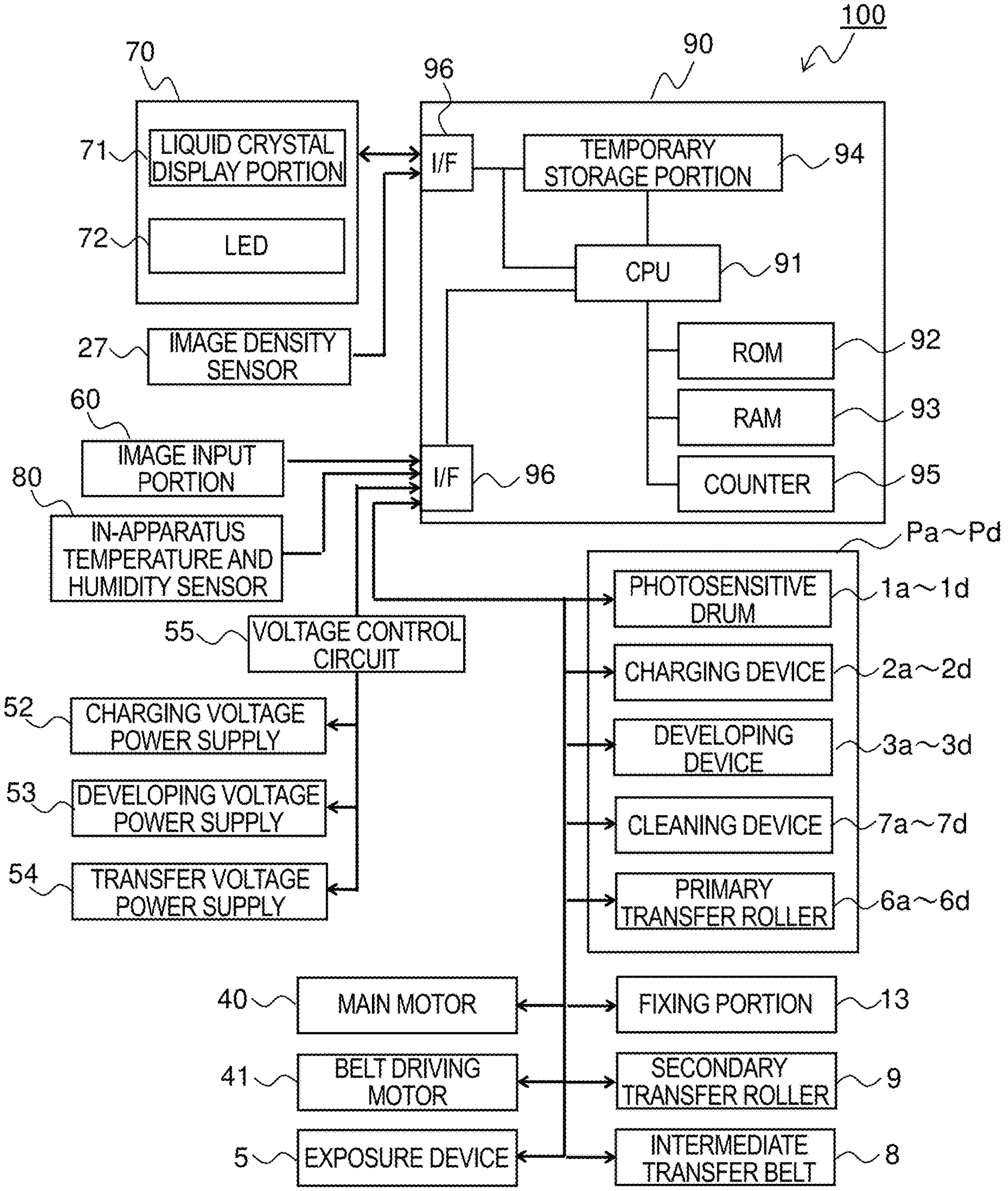
FIG. 3 is a block diagram showing one example of control paths used in the color printer.

FIG. 3 is a block diagram showing one example of control paths used in the color printer 100. In actual use of the color printer 100, different parts thereof are controlled in different ways across complicated control paths all over the color printer 100. To avoid complexity, the following description focuses on those control paths which are necessary for implementing the present disclosure.

A charging voltage power supply 52 applies a charging voltage (a DC voltage) to the charging roller 21 in each of the charging devices 2*a* to 2*d*. A developing voltage power supply 53 applies a developing voltage obtained by superimposing an AC voltage on a DC voltage to the developing roller 29 in each of the developing devices 3*a* to 3*d*. A transfer voltage power supply 54 applies a prescribed primary transfer voltage to each of the primary transfer rollers 6*a* to 6*d* and a prescribed secondary transfer voltage to the secondary transfer roller 9. A voltage control circuit 55 is connected to the charging voltage power supply 52, the developing voltage power supply 53, and the transfer voltage power supply 54 and, based on an output signal from a control section 90, operates these power supplies.

An image input portion 60 is a receiver that receives image data transmitted from a personal computer or the like to the color printer 100. An image signal inputted from the image input portion 60 is converted into a digital signal, which then is sent out to a temporary storage portion 94.

In an operation section 70, there are provided a liquid crystal display portion 71 and an LED 72. The liquid crystal display portion 71 displays an operation state of the color printer 100, an image forming status thereof, the number of copies printed thereby, and so on. The LED 72 displays various states of the color printer 100, errors, and so on. Various settings for the color printer 100 can be made also via a printer driver of a personal computer.

In the operation section 70, in addition to the above, there are provided a start button with which a user gives an instruction to start image formation, a stop/clear button used, for example, to stop image formation, a reset button used to reset the various settings for the color printer 100 to a default state, and so on.

An in-apparatus temperature and humidity sensor 80 senses a temperature and a humidity inside the color printer 100, particularly, a temperature and a humidity around the image forming portions Pa to Pd and is arranged in a vicinity of the image forming portions Pa to Pd.

The control section 90 includes at least a CPU (central processing unit) 91 as a central arithmetic processor, a ROM (read-only memory) 92 as a read-only storage portion, a RAM (random-access memory) 93 as a readable/writable storage portion, a temporary storage portion 94 that temporarily stores image data or the like, a counter 95, and a plurality of (here, two) I/Fs (interfaces) 96 that transmit control signals to different devices in the color printer 100 and receive input signals from the operation section 70. The control section 90 can be arranged at any location inside the main body of the color printer 100.

The ROM 92 stores data and the like that are not changed during use of the color printer 100, such as control programs for the color printer 100 and numerical values required for control. The RAM 93 stores necessary data generated while the color printer 100 is controlled, data temporarily required for control of the color printer 100, and the like. The temporary storage portion 94 temporarily stores an image signal inputted from the image input portion 60 and converted into a digital signal. The counter 95 counts the number of sheets printed in a cumulative manner.

Furthermore, the control section 90 transmits control signals from the CPU 91 to different parts and devices in the color printer 100 through the I/Fs 96. Furthermore, from the different parts and devices, signals that indicate their states and input signals are transmitted to the CPU 91 through the I/Fs 96. Examples of the different parts and devices controlled by the control section 90 include the image forming portions Pa to Pd, the exposure device 5, the intermediate transfer belt 8, the secondary transfer roller 9, the fixing portion 13, the voltage control circuit 55, the image input portion 60, the operation section 70, and the in-apparatus temperature and humidity sensor 80.

[2. Configuration of Photosensitive Drum]

Figure 4:
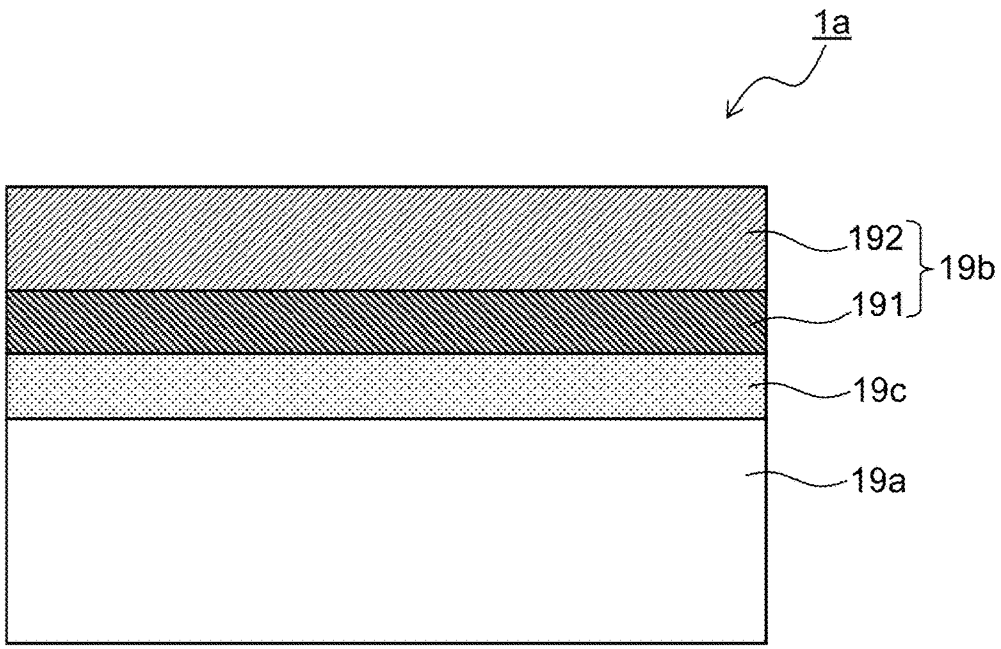
FIG. 4 is a partial sectional view showing a laminar structure of a photosensitive drum used in the color printer according to the embodiment.

FIG. 4 is a partial sectional view of the conductive substrate 19*a* and the photosensitive layer 19*b* of the photosensitive drum 1*a*. With reference to FIG. 4, the following describes the photosensitive drums 1*a* to 1*d* used in the color printer 100 according to this embodiment. The photosensitive drums 1*b* to 1*d* are identical in configuration to the photosensitive drum 1*a*.

The photosensitive drum 1*a* is referred to also as a multi-layer electrophotographic photosensitive member. As shown in FIG. 4, the photosensitive drum 1*a* according to this embodiment includes the conductive substrate 19*a*, the photosensitive layer 19*b*, and an intermediate layer 19*c* (an undercoat layer). The photosensitive layer 19*b* includes an electric charge generation layer 191 and an electric charge transport layer 192.

In a configuration shown in FIG. 4, the photosensitive layer 19*b* is stacked on the conductive substrate 19*a* via the intermediate layer 19*c*. That is, the intermediate layer 19*c* is stacked on the conductive substrate 19*a*, the electric charge generation layer 191 is stacked on the intermediate layer 19*c*, and the electric charge transport layer 192 is stacked on the electric charge generation layer 191.

In the configuration shown in FIG. 4, the photosensitive layer 19*b* (the electric charge transport layer 192) constitutes an outermost surface layer of the photosensitive drum 1*a*. The photosensitive drum 1*a* may further include a protective layer (not shown) in addition to the conductive substrate 19*a*, the photosensitive layer 19*b*, and the intermediate layer 19*c*. As the outermost surface layer of the photosensitive drum 1*a*, the protective layer is stacked on the photosensitive layer 19*b*. The following describes, in detail, constituent elements of the photosensitive drum 1*a*.

(Conductive Substrate)

There is no particular limitation on a material for the conductive substrate 19*a*, and it is only required that at least a surface thereof be formed of a material having conductivity. One example of the conductive substrate 19*a* is formed of the material having conductivity. Another example of the conductive substrate 19*a* is coated with the material having conductivity. Examples of the material having conductivity include aluminum, iron, copper, tin, platinum, silver, vanadium, molybdenum, chromium, cadmium, titanium, nickel, palladium, and indium. Two or more types of materials having conductivity may be used in combination as an alloy (more specifically, an aluminum alloy, stainless steel, brass, or the like). As the material having conductivity, aluminum and an aluminum alloy are preferable in terms of favorable electric charge movement from the photosensitive layer 19*b* to the conductive substrate 19*a*.

(Electric Charge Generation Layer)

The electric charge generation layer 191 contains a phthalocyanine pigment that is an electric charge generating agent and a first resin. While there is no particular limitation on a thickness of the electric charge generation layer 191, the thickness is preferably not less than 0.01 μm and not more than 5 μm and more preferably not less than 0.1 μm and not more than 1 μm. The electric charge generation layer 191 is, for example, a single layer.

As the electric charge generating agent, the phthalocyanine pigment is contained in the electric charge generation layer 191. In the electric charge generation layer 191, the phthalocyanine pigment is, for example, dispersed in the first resin. The phthalocyanine pigment is a pigment having a phthalocyanine structure. Examples of the phthalocyanine pigment include metal-free phthalocyanine and metal phthalocyanine. Examples of the metal phthalocyanine include titanyl phthalocyanine, copper phthalocyanine, hydroxygallium phthalocyanine, and chlorogallium phthalocyanine.

The phthalocyanine pigment may be crystalline or noncrystalline. An example of crystalline metal-free phthalocyanine is metal-free phthalocyanine having an X-form crystal structure (hereinafter, referred to also as X-form metal-free phthalocyanine). Examples of crystalline titanyl phthalocyanine include titanyl phthalocyanine having an α-form crystal structure, titanyl phthalocyanine having a β-form crystal structure, and titanyl phthalocyanine having a Y-form crystal structure (hereinafter, referred to also as α-form titanyl phthalocyanine, β-form titanyl phthalocyanine, and Y-form titanyl phthalocyanine, respectively). An example of crystalline copper phthalocyanine is ε-form copper phthalocyanine.

The phthalocyanine pigment is preferably titanyl phthalocyanine and more preferably Y-form titanyl phthalocyanine. Y-form titanyl phthalocyanine is crystalline titanyl phthalocyanine that has a main peak at, for example, a Bragg angle 2θ+0.2° of 27.2° in a CuKα characteristic X-ray diffraction spectrum.

The first resin is a binder resin contained in the electric charge generation layer 191. Examples of the first resin include thermoplastic resins (more specifically, a polycarbonate resin, a polyarylate resin, a styrene-based resin, a styrene-butadiene copolymer, a styrene-acrylonitrile copolymer, a styrene-maleate copolymer, a styrene-acrylate copolymer, an acrylic copolymer, a polyethylene resin, an ethylene-vinyl acetate copolymer, a chlorinated polyethylene resin, a polyvinyl chloride resin, a polypropylene resin, an ionomer, a vinyl chloride-vinyl acetate copolymer, a polyester resin, an alkyd resin, a polyamide resin, a polyurethane resin, a polysulfone resin, a diallyl phthalate resin, a ketone resin, a polyvinyl butyral resin, a polyvinyl acetal resin, and a polyether resin), thermosetting resins (more specifically, a silicone resin, an epoxy resin, a phenolic resin, an urea resin, a melamine resin, and other cross-linkable thermosetting resins), and photocurable resins (more specifically, an epoxy-acrylic acid-based resin and an urethane-acrylic acid-based copolymer). The first resin preferably contains a polyvinyl acetal resin or a butyral resin and more preferably contains a polyvinyl acetal resin.

(Electric Charge Transport Layer)

The electric charge transport layer 192 contains, for example, a hole transport agent, a second resin, and an antioxidant. Preferably, the electric charge transport layer 192 further contains an electron acceptor compound. While there is no particular limitation on a thickness of the electric charge transport layer 192, the thickness is preferably not less than 2 μm and not more than 100 μm and more preferably not less than 10 μm and not more than 50 μm. The electric charge transport layer 192 is, for example, a single layer.

Examples of the hole transport agent include a triarylamine derivative, a diamine derivative, an oxadiazole-based compound, a styryl-based compound, a carbazole-based compound, an organic polysilane compound, a pyrazoline-based compound, a hydrazone-based compound, an indole-based compound, an oxazole-based compound, an isoxazole-based compound, a thiazole-based compound, a thiadiazole-based compound, an imidazole-based compound, a pyrazole-based compound, and a triazole-based compound.

Relative to 100 parts by mass of the second resin, the hole transport agent is contained in a content of preferably not less than 10 parts by mass and not more than 200 parts by mass and more preferably not less than 40 parts by mass and not more than 80 parts by mass.

The second resin is a binder resin contained in the electric charge transport layer 192. Examples of the second resin are the same as the aforementioned examples of the first resin contained in the electric charge generation layer 191. In order to favorably form the electric charge transport layer 192, preferably, as the second resin, a resin different from the first resin contained in the electric charge generation layer 191 is selected from the examples of the second resin. The second resin is preferably a polycarbonate resin.

Examples of the electron acceptor compound include a quinone-based compound, a diimide-based compound, a hydrazone-based compound, a malononitrile-based compound, a thiopyran-based compound, a trinitrothioxanthone-based compound, a 3,4,5,7-tetranitro-9-fluorenone-based compound, a dinitroanthracene-based compound, a dinitroacridine-based compound, tetracyanoethylene, 2,4,8-trinitrothioxanthone, dinitrobenzene, dinitroacridine, succinic anhydride, maleic anhydride, and dibromomaleic anhydride. Examples of the quinone-based compound include a diphenoquinone-based compound, an azoquinone-based compound, an anthraquinone-based compound, a naphthoquinone-based compound, a nitroanthraquinone-based compound, and a dinitroanthraquinone-based compound.

As the antioxidant, a compound expressed by a general formula (1) below is used.

(1)

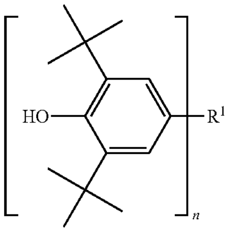

In the formula (1), $R^1$ represents an alkyl group having 1 to 10 carbon atoms or a general formula (2) below in which $R^2$ represents an alkyl group having 1 to 10 carbon atoms.

(2)

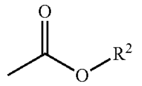

(Intermediate Layer)

The intermediate layer 19*c* (the undercoat layer) contains, for example, either or both of inorganic particles and organic particles and a resin used for intermediate layer formation (an intermediate layer resin). Hereinafter, the inorganic particles and the organic particles that may be contained in the intermediate layer 19*c* may be referred to collectively as intermediate layer particles. Since the intermediate layer 19*c* is present, it is possible, while maintaining a sufficient level of insulation to be able to suppress the occurrence of a leakage current, to facilitate flow of an electric current generated when the photosensitive member is exposed to light, thus suppressing an increase in resistance.

Examples of the inorganic particles include white pigments (more specifically, titanium oxide, zinc oxide, zinc white, zinc sulfide, white lead, lithopone, and so on) and extender pigments (more specifically, alumina, calcium carbonate, barium sulfate, and so on). Examples of the organic particles include fluororesin particles, benzoguanamine resin particles, and styrene resin particles. The intermediate layer particles are preferably inorganic particles and more preferably titanium oxide particles. The titanium oxide particles have a number average primary particle diameter of preferably not more than 100 nm and more preferably not less than 1 nm and not more than 50 nm. The titanium oxide particles may have been subjected to a surface treatment. The surface treatment of the titanium oxide particles may be performed once or multiple times (for example, twice). Examples of a surface treatment agent used for the surface treatment of the titanium oxide particles include alumina, silica, and organosilicon compounds (for example, polysiloxane, and more specifically, methyl hydrogen polysiloxane).

Examples of the intermediate layer resin are the same as the aforementioned examples of the first resin. In order to favorably form the intermediate layer 19*c*, preferably, as the intermediate layer resin, a resin different from the first resin contained in the electric charge generation layer 191 is selected from the examples of the intermediate layer resin. As the intermediate layer resin, a polyamide resin is preferable in terms of being hygroscopic. A ratio of a mass of the intermediate layer particles to a mass of the intermediate layer resin is preferably not less than 1 and less than 4. The intermediate layer 19*c* preferably has a thickness of not less than 0.1 μm and not more than 5 μm. The intermediate layer particles preferably have a number average particle diameter of not less than 1 nm and not more than 700 nm. The intermediate layer particles preferably have a cumulative 50% diameter (D50) of not less than 300 nm and not more than 500 nm in a particle size distribution in terms of volume. The intermediate layer particles preferably have a cumulative 90% diameter (D90) of not less than 500 nm and not more than 1000 nm in the particle size distribution in terms of volume.

(Additive)

Each of the electric charge generation layer 191, the electric charge transport layer 192, and the intermediate layer 19*c* may contain an additive as necessary. Examples of the additive include an ultraviolet absorbing agent, an antioxidant, a radical scavenger, a singlet quencher, a softener, a surface modifier, an extender, a thickener, a dispersion stabilizer, a wax, a donor, a surfactant, a plasticizer, a sensitizer, and a leveling agent. The antioxidant is preferably a hindered phenol antioxidant and more preferably butylated hydroxytoluene. The leveling agent is preferably a silicone oil and more preferably a silicone oil having a dimethylpolysiloxane structure.

[3. Method for Manufacturing Photosensitive Drum]

A method for manufacturing the photosensitive drums 1*a* to 1*d* include, for example, an intermediate layer forming step, an electric charge generation layer forming step, and an electric charge transport layer forming step. The following describes a method for manufacturing the photosensitive drums 1*a* to 1*d* having a laminar structure shown in FIG. 4.

In the intermediate layer forming step, first, an application liquid for intermediate layer formation is prepared. The intermediate layer application liquid thus prepared is applied onto the conductive substrate 19*a*. Next, at least a part of a solvent contained in the intermediate layer application liquid thus applied is removed, so that the intermediate layer 19*c* is formed. The intermediate layer application liquid contains, for example, the first resin, the inorganic particles, and the solvent. Such an intermediate layer application liquid is prepared by dissolving or dispersing the first resin and the inorganic particles in the solvent.

In the electric charge generation layer forming step, first, an application liquid for electric charge generation layer formation is prepared. The electric charge generation layer application liquid thus prepared is applied onto the intermediate layer 19*c*. Next, at least a part of a solvent contained in the electric charge generation layer application liquid thus applied is removed, so that the electric charge generation layer 191 is formed. The electric charge generation layer application liquid contains, for example, a phthalocyanine pigment as the electric charge generating agent, the first resin, and the solvent. Such an electric charge generation layer application liquid is prepared by dissolving or dispersing the electric charge generating agent and the first resin in the solvent. The electric charge generation layer application liquid may further contain the additive as necessary.

In the electric charge transport layer forming step, first, an application liquid for forming the electric charge transport layer 192 (an electric charge transport layer application liquid) is prepared. The electric charge transport layer application liquid is applied onto the electric charge generation layer 191. Next, at least a part of a solvent contained in the electric charge transport layer application liquid thus applied is removed, so that the electric charge transport layer 192 is formed. The electric charge transport layer application liquid contains the hole transport agent, the second resin, and the solvent. The electric charge transport layer application liquid can be prepared by dissolving or dispersing the hole transport agent and the second resin in the solvent. The electric charge transport layer application liquid may further contain the electron acceptor compound and the additive as necessary.

There is no particular limitation on the respective solvents contained in the electric charge generation layer application liquid and the electric charge transport layer application liquid (each also referred to simply as an application liquid) as long as the respective components contained in the application liquids can be dissolved or dispersed therein. Examples of the solvents include alcohols such as methanol, ethanol, isopropanol, and butanol, aliphatic hydrocarbons such as n-hexane, octane, and cyclohexane, aromatic hydrocarbons such as benzene, toluene, and xylene, halogenated hydrocarbons such as methylene chloride, chloroform, ethylene chloride, dichloromethane, dichloroethane, carbon tetrachloride, and chlorobenzene, ethers such as dioxane, dimethyl ether, diethyl ether, tetrahydrofuran, ethylene glycol dimethyl ether, propylene glycol monomethyl ether, and diethylene glycol dimethyl ether, ketones such as acetone, methyl ethyl ketone, 2-butanone, and cyclohexanone, esters such as ethyl acetate and methyl acetate, dimethyl formaldehyde, dimethyl formamide, and dimethyl sulfoxide.

The solvent contained in the electric charge transport layer application liquid is preferably different from the solvent contained in the electric charge generation layer application liquid. This prevents, when the electric charge transport layer application liquid is applied onto the electric charge generation layer 191, the electric charge generation layer 191 from being dissolved in the solvent in the electric charge transport layer application liquid.

The application liquids are prepared by mixing the respective components and dispersing them in the respective solvents. The mixing or dispersion can be performed using, for example, a bead mill, a ball mill, a roll mill, a paint shaker, or an ultrasonic disperser.

Because crystals of a phthalocyanine pigment are hard to be pulverized, the mixing or dispersion of the electric charge generation layer application liquid is performed using preferably a medium type disperser capable of performing mixing or dispersion with a low shear force and more preferably a bead mill or a ball mill. Examples of a medium used in the disperser include glass beads, alumina beads, zircon beads, and zirconia beads. As the media used in the disperser, zirconia beads are preferable in terms of their high specific gravity.

There is no particular limitation on a method for applying the application liquids as long as uniform application of the application liquids can be achieved. Examples of the application method include dip coating, spray coating, bead coating, blade coating, and roller coating.

Examples of a method for removing at least a part of each of the respective solvents contained in the application liquids include heating, pressure reduction, and a combination thereof. A more specific example is a method in which a heat treatment (hot-air drying) is performed using a high-temperature dryer or a reduced pressure dryer. The heat treatment is performed at a temperature of, for example, not less than 40° C. and not more than 150° C. The heat treatment is performed for a duration of, for example, not less than 3 minutes and not more than 150 minutes.

The method for manufacturing the photosensitive drums 1*a* to 1*d* may further include a step of forming the protective layer on a surface of the electric charge transport layer 192 as necessary. As a method for performing the step of forming the protective layer, any known method can be selected as appropriate.

[4. Configuration of Charging Roller]

Figure 5:
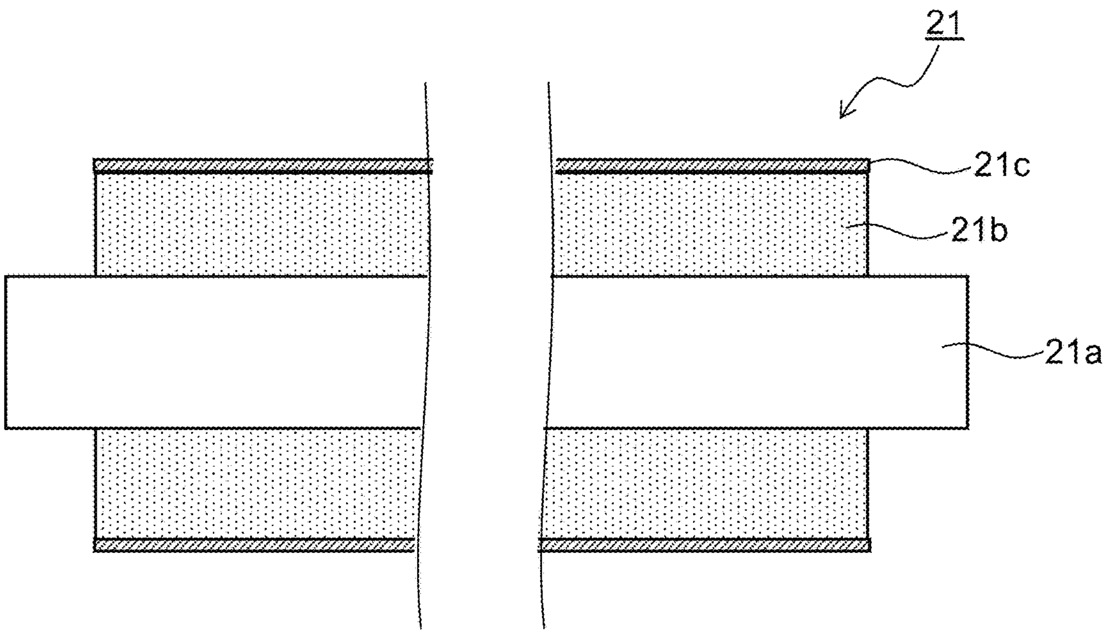
FIG. 5 is a sectional side view obtained by cutting a charging roller used in the color printer according to the embodiment along an axial direction thereof.

FIG. 5 is a sectional side view obtained by cutting the charging roller 21 used in the color printer 100 according to this embodiment along an axial direction thereof. With reference to FIG. 5, the following describes the charging roller 21 used in the color printer 100 according to this embodiment. The charging roller 21 performs electric discharge from a surface layer 21*c* thereof to an outer circumferential surface of each of the photosensitive drums 1*a* to 1*d* so as to charge the photosensitive layer 19*b* of the each of the photosensitive drums 1*a* to 1*d*. The charging roller 21 includes a metal core 21*a*, an elastic layer 21*b* stacked on an outer circumferential surface of the metal core 21*a*, and the surface layer 21*c* stacked on a surface of the elastic layer 21*b*.

The elastic layer 21*b* is formed using, for example, rubber as a base material. Examples of the rubber used to form the elastic layer 21*b* include a polyurethane-based elastomer, hydrin rubber (specifically, epichlorohydrin rubber), styrene-butadiene rubber (SBR), polynorbornene rubber, ethylene-propylene-diene rubber (EPDM), acrylonitrile-butadiene rubber (NBR), hydrogenated acrylonitrile-butadiene rubber (H-NBR), butadiene rubber (BR), isoprene rubber (IR), natural rubber (NR), and silicone rubber. Any one of these types of rubber may be used alone, or any two or more of them may be used in combination. The rubber contained in the elastic layer 21*b* is preferably epichlorohydrin rubber. The elastic layer 21*b* has a thickness of about 3 mm to 5 mm.

The elastic layer 21*b* may further contain a conductive agent so as to have increased conductivity. Examples of the conductive agent include carbon black, graphite, potassium titanate particles, iron oxide particles, titanium oxide particles, zinc oxide particles, tin oxide particles, and ion conductive agents (for example, quaternary ammonium salts, borates, and surfactants). Any one of these conductive agents may be used alone, or any two or more of them may be used in combination. The conductive agent is preferably an ion conductive agent. The elastic layer 21*b* may further contain any of a foaming agent, a crosslinking agent, a crosslinking accelerator, and an oil as necessary.

The surface layer 21*c* preferably contains a conductive filler. Examples of the conductive filler include carbon black (particularly, KETJEN BLACK), graphite, potassium titanate particles, iron oxide particles, titanium oxide particles, zinc oxide particles, tin oxide particles, and phosphorus-doped tin oxide particles. The conductive filler is preferably tin oxide particles, phosphorous-doped tin oxide particles, or KETJEN BLACK. The conductive filler preferably has an average particle diameter of not less than 5 nm and not more than 200 nm.

In a case where the surface layer 21*c* contains the conductive filler, a content percentage of the conductive filler in the surface layer 21*c* is preferably not more than 35% by mass and more preferably not less than 2% by mass and not more than 25% by mass. The surface layer 21*c* may further contain any of a foaming agent, a crosslinking agent, a crosslinking accelerator, and an oil as necessary.

In this embodiment, the charging roller 21 is designed to have a resistance value in a prescribed range so that the occurrence of discharge unevenness is suppressed. Specifically, the charging roller 21 is set to have a resistance value in a range of $2\times 10^5$ to $2\times10^6$[Ω] when a DC voltage of 500 V is applied thereto under a low-temperature and low-humidity environment (10° C./10% RH).

The resistance value of the charging roller 21 can be measured by a method described below. First, an opposed metal roller as a measurement jig is caused to contact the charging roller 21. Further, an electric current is measured that flows, in the charging roller 21, from the surface layer 21*c* through the elastic layer 21*b* to the metal core 21*a* when a DC voltage of 500 V is applied to the opposed metal roller, and thus the resistance value [Ω] of the charging roller 21 as a whole is measured.

In the color printer 100 according to this embodiment, the photosensitive drums 1*a* to 1*d* and the charging roller 21, which are configured as above, are used in combination, and thus it is possible to effectively suppress the occurrence of a streak-shaped charge unevenness image under the low-temperature and low-humidity environment (around 10° C./10% RH).

In a case where a discharge product is deposited on the photosensitive layer 19*b* under the low-temperature and low-humidity environment (around 10° C./10% RH), the photosensitive layer 19*b* might be affected by the discharge product, thus being changed in its surface state. When, as in this embodiment, a particular type of antioxidant is added to the electric charge transport layer 192 as a component of the photosensitive layer 19*b*, such a change in the surface state of the photosensitive layer 19*b* due to the discharge product is suppressed more than in a conventional configuration. Furthermore, the charging roller 21 is set to have a resistance value in the range of $2\times10^5$ to $2\times10^6$[Ω], and thus charge uniformity of the photosensitive layer 19*b* is improved.

In addition, the present disclosure is not limited to the foregoing embodiment and can be variously modified without departing from the spirit of the present disclosure. For example, while the foregoing embodiment has described the color printer 100 including the developing devices 3*a* to 3*d* that employ the two-component development method using a two-component developer containing toner and a magnetic carrier, the present disclosure is applicable also to an image forming apparatus including a developing device that employs a mono-component development method using a mono-component developer formed only of toner.

Furthermore, while the foregoing embodiment has described the color printer 100 of a tandem-type as an example of the image forming apparatus, needless to say, the present disclosure is not limited thereto and is applicable also to other types of image forming apparatuses employing a contact charging method in which a photosensitive drum is charged using a charging roller, such as a monochrome printer, monochrome and color copy machines, and a digital multifunctional peripheral. By means of examples, the following more specifically describes effects of the present disclosure.

Example 1

<Manufacturing of Photosensitive Drum A-1>

(Preparation of Intermediate Layer Application Liquid)

A mixed solvent A was obtained by mixing methanol, n-butanol, and toluene (mass ratio: methanol/n-butanol/toluene=3/1/1), and a resin solution B was obtained by dissolving 1 part by mass of a polyamide resin ("AMILAN (registered trademark) CM8000" manufactured by Toray Industries, Inc., a quarterpolymer polyamide resin composed of polyamide 6, polyamide 12, polyamide 66, and polyamide 610) in 4 parts by mass of the mixed solvent A. The intermediate layer application liquid was obtained by mixing 2.0 parts by mass of titanium oxide (having a number average particle diameter of 10 nm and obtained through a secondary surface treatment using methyl hydrogen polysiloxane on titanium oxide subjected to a primary surface treatment using alumina and silica), 0.5 parts by mass of ion exchange water, 5.0 parts by mass of the resin solution B, and 8.0 parts by mass of the mixed solvent A using a circulation type wet disperser ("DYNO (registered trademark)-MILL" manufactured by Willy A. Bachofen AG). The mixing was performed for 6 hours at a peripheral speed of 8 m/second.

(Formation of Intermediate Layer)

The intermediate layer application liquid thus obtained was filtered using a filter having a mesh size of 30 μm. Thereafter, the intermediate layer application liquid was applied to a surface of a conductive substrate by dip coating. The conductive substrate used was a drum-shaped aluminum support (diameter: 30 mm, length: 245.0 mm). Subsequently, the conductive substrate on which the intermediate layer application liquid had been applied was subjected to a heat treatment at 120° C. for 20 minutes, and thus an intermediate layer (film thickness: 1.0 μm) was formed on the conductive substrate.

(Preparation of Electric Charge Generation Layer Application Liquid)

A mixed solvent C was obtained by mixing propylene glycol monomethyl ether and tetrahydrofuran (mass ratio: propylene glycol monomethyl ether/tetrahydrofuran=1/2), and a resin solution D was obtained by dissolving 1.0 parts by mass of a polyvinyl acetal resin ("S-LEC BX-5" manufactured by Sekisui Chemical Co., Ltd.) in 19.0 parts by mass of the mixed solvent C. The electric charge generation layer application liquid was obtained by mixing 2.3 parts by mass of Y-form titanyl phthalocyanine as the electric charge generating agent, 20.0 parts by mass of the resin solution D, and 65.0 parts by mass of the mixed solvent C using a medium type disperser (a bead mill). The mixing was performed for 4 hours at a peripheral speed of 60 rpm, a medium used in the medium type disperser was zirconia beads (having a diameter of 0.65 mm), and a filling rate of the medium in the medium type disperser was 46.2%.

(Formation of Electric Charge Generation Layer)

The electric charge generation layer application liquid thus obtained was filtered using a filter having a mesh size of 5 μm. Thereafter, the electric charge generation layer application liquid was applied onto the intermediate layer by dip coating. Subsequently, the conductive substrate on which the electric charge generation layer application liquid had been applied was subjected to a heat treatment at 90° C. for 20 minutes. In this manner, an electric charge generation layer (layer thickness: 0.2 μm) was formed on the intermediate layer.

(Preparation of Electric Charge Transport Layer Application Liquid)

A mixed solvent E was obtained by mixing toluene and tetrahydrofuran (mass ratio: toluene/tetrahydrofuran=1/9), and the electric charge transport layer application liquid was obtained by dissolving 41.00 parts by mass of a hole transport agent (HTM-1), 2.00 parts by mass of an electron acceptor compound (EA-1), 0.05 parts by mass of a leveling agent ("KF96-50CS" manufactured by Shin-Etsu Chemical Co., Ltd., a dimethyl silicone oil), 100.00 parts by mass of a polyarylate resin (having at least repeating units expressed by chemical formulae RZ-1 and RZ-2 below), and 2.00 parts by mass of an antioxidant (AOX-1) in 750.00 parts by mass of the mixed solvent E.

(HTM-1)

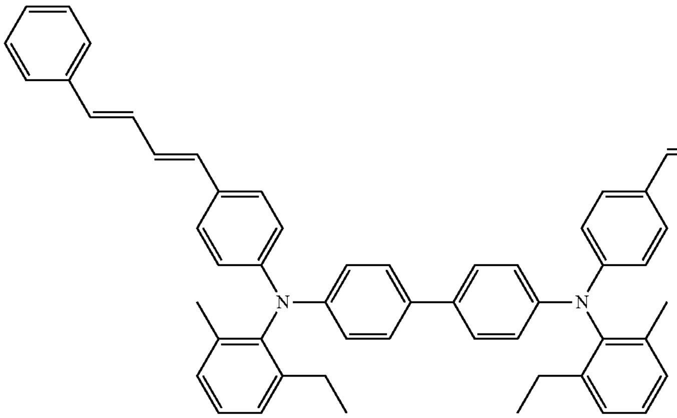

(EA-1)

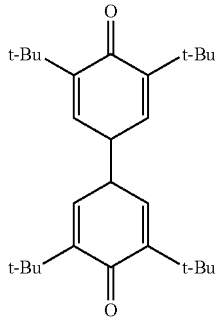

(RZ-1)

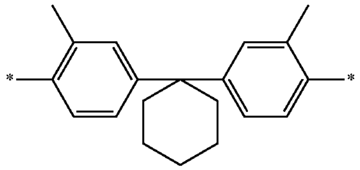

-continued

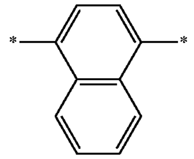

(RZ-2)

(Formation of Electric Charge Transport Layer)

The electric charge transport layer application liquid was applied onto the electric charge generation layer by dip coating. Subsequently, the conductive substrate on which the electric charge transport layer application liquid had been applied was heated at a heating rate of 1° C./minute from 60° C. to 125° C. and was subjected to a heat treatment at 125° C. for 75 minutes in total. In the above-described manner, an electric charge transport layer (layer thickness: 27.0 μm) was formed on the electric charge generation layer, and thus a photosensitive drum (A-1) was obtained in which the intermediate layer was stacked on the conductive substrate, the electric charge generation layer was stacked on the intermediate layer, and the electric charge transport layer was stacked on the electric charge generation layer.

<Manufacturing of Photosensitive Drums A-2 to A-11>

Photosensitive drums (A-2) to (A-9) were obtained by a similar method to the above except that an amount of the antioxidant (AOX-1) added to the electric charge transport layer was made to vary or except that an antioxidant (AOX-2) or an antioxidant (AOX-3) was added thereto in place of the antioxidant (AOX-1). Furthermore, a photosensitive drum (A-10) was obtained by a similar method to the above except that no intermediate layer was formed between the conductive substrate and the electric charge generation layer. Furthermore, a photosensitive drum (A-11) was obtained by a similar method to the above except that no antioxidant was added to the electric charge transport layer.

(AOX-2)

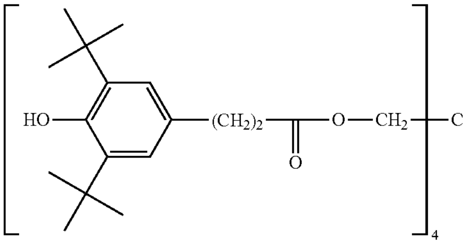

(AOX-3)

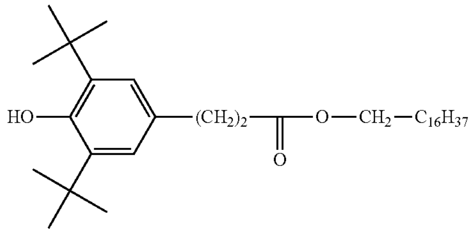

<Manufacturing of Charging Roller R-1>

(AOX-1)

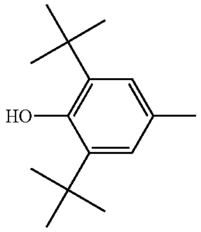

(Formation of Elastic Layer)

A mixture was obtained by adding 5.0 parts by mass of a vulcanizing aid (zinc oxide, "Zinc Oxide Type II" manufactured by Mitsui Mining & Smelting Co., Ltd.), 1.5 parts by mass of a vulcanizing accelerator 1 (MBT, "Nocceler M-P" manufactured by Ouchi Shinko Chemical Industrial Co., Ltd.), 1 part by mass of sulfur ("Sulfax PS" manufactured by Tsurumi Chemical Industry Co., Ltd.), 50.0 parts by mass of a filler (calcium carbonate, "Hakuenka CC" manufactured by Shiraishi Kogyo Kaisha, Ltd.), 30 parts by mass of carbon black as an electron conductive agent ("Asahi #50" manufactured by Asahi Carbon Co., Ltd.), and 0.50 parts by mass of sodium trifluoroacetate as the conductive agent to 100.0 parts by mass of hydrin rubber ("Epichlomer CG-102" manufactured by Osaka Soda Co., Ltd.). The mixture was stirred and mixed using a stirrer so that a rubber composition was prepared. A metal core (having a diameter of 6 mm) was placed in a molding die, into which the above-described rubber composition was poured, and heating was performed at 160° C. for 20 minutes, followed by cooling and removal of the molding die, so that an elastic layer (layer thickness: 1.8 mm) was formed on an outer circumference of the metal core.

(Formation of Surface Layer)

A binder resin was diluted with methanol, butanol, toluene or the like as a diluting solvent, and a surface layer liquid was obtained by uniformizing therein fine particles containing a conductive material such as metal oxide through a dispersion treatment using a wet disperser typified by a ball mill. Next, the surface layer liquid thus obtained was applied to an outer circumferential surface of the elastic layer by blade coating and was then dried in an electric furnace at 120° C. for an hour, and thus a charging roller R-1 was obtained in which a surface layer was stacked on the elastic layer.

<Manufacturing of Charging Rollers R-2 to R-5>

Charging rollers R-2 to R-5 having different resistance values were obtained by a similar method to the above except that respective amounts of the electron conductive agent and the conductive agent added to the elastic layer 21*b* were made to vary.

Example 2

<Test to Determine Effect of Suppressing Streak-Shaped Charge Unevenness>

Using the photosensitive drums A-1 to A-11 and the charging rollers R-1 to R-5 manufactured in Example 1, a study was conducted of relationships between combinations of the photosensitive drums A-1 to A-11 and the charging rollers R-1 to R-5 and the effect of suppressing streak-shaped charge unevenness.

In a test method adopted, using a digital copy machine (manufactured by Konica Minolta, Inc., product name:

bizhubC287i), the combinations of the photosensitive drums A-1 to A-11 and the charging rollers R-1 to R5 manufactured in Example 1 were evaluated for items listed below under the low-temperature and low-humidity environment (10° C./10% RH).

(Streak-Shaped Charge Unevenness)

A visual evaluation was performed as to whether streak-shaped charge unevenness had occurred on an initial-stage halftone image. Evaluation criteria used were as follows. That is, a very good result in which no streaks were observed at all on the halftone image was indicated as "VG" (very good), a poor result in which streaks were slightly observed thereon was indicated as "P" (poor), and a very poor result in which streaks were clearly observed thereon was indicated as "VP" (very poor).

(Image Density)

There was performed a printing aging test in which 200 k (two hundred thousand) sheets of solid black images were printed, and an image density of each of an initial-stage image and an image obtained after the aging test was measured using a differential colorimeter (a spectrodensitometer manufactured by Konica Minolta, Inc., model: FD-9), based on which an image density difference (ΔID) between the initial-stage image and the image obtained after the aging test was evaluated. Evaluation criteria used were as follows. That is, a very good result ($\Delta ID \leq 0.15$) was indicated as "VG" (very good), a good result ($0.15 < \Delta ID < 0.35$) was indicated as "G" (good), and a poor result ($0.35 \leq \Delta ID$) was indicated as "P" (poor). Table 1 shows, along with the combinations of the photosensitive drums and the charging rollers, results of evaluating streak-shaped charge unevenness and measured values of the image density.

TABLE 1

| | Photosensitive Drum | | | | Charging Roller | | Image Evaluation *3 | |
|---|---|---|---|---|---|---|---|---|
| | | | Antioxidant | | | Resistance | Streak-Shaped | |
| | No. | Intermediate Layer | Type | Additive Amount *1 | No. | Value *2 [Ω] | Charge Unevenness | Image Density |
| Disclosure Example 1 | A-1 | Present | AOX-1 | 2 | R-1 | $9 \times 10^5$ | VG | 0.13 |
| Disclosure Example 2 | A-2 | | AOX-1 | 5 | R-1 | $9 \times 10^5$ | VG | 0.12 |
| Disclosure Example 3 | A-3 | | AOX-1 | 7 | R-1 | $9 \times 10^5$ | VG | 0.13 |
| Disclosure Example 4 | A-1 | | AOX-1 | 2 | R-2 | $7 \times 10^5$ | VG | 0.12 |
| Disclosure Example 5 | A-1 | | AOX-1 | 2 | R-3 | $1 \times 10^6$ | VG | 0.11 |
| Disclosure Example 6 | A-4 | | AOX-2 | 2 | R-1 | $9 \times 10^5$ | VG | 0.12 |
| Disclosure Example 7 | A-5 | | AOX-2 | 5 | R-1 | $9 \times 10^5$ | VG | 0.13 |
| Disclosure Example 8 | A-6 | | AOX-2 | 7 | R-1 | $9 \times 10^5$ | VG | 0.12 |
| Disclosure Example 9 | A-4 | | AOX-2 | 2 | R-2 | $7 \times 10^5$ | VG | 0.12 |
| Disclosure Example 10 | A-4 | | AOX-2 | 2 | R-3 | $1 \times 10^6$ | VG | 0.14 |
| Disclosure Example 11 | A-7 | | AOX-3 | 2 | R-1 | $9 \times 10^5$ | VG | 0.13 |
| Disclosure Example 12 | A-8 | | AOX-3 | 5 | R-1 | $9 \times 10^5$ | VG | 0.13 |
| Disclosure Example 13 | A-9 | | AOX-3 | 7 | R-1 | $9 \times 10^5$ | VG | 0.14 |
| Disclosure Example 14 | A-7 | | AOX-3 | 2 | R-2 | $7 \times 10^5$ | VG | 0.13 |
| Disclosure Example 15 | A-7 | | AOX-3 | 2 | R-3 | $1 \times 10^6$ | VG | 0.14 |
| Comparative Example 1 | A-10 | Absent | AOX-1 | 2 | R-1 | $9 \times 10^5$ | VP | 0.38 |
| Comparative Example 2 | A-11 | Present | — | 0 | R-1 | $9 \times 10^5$ | VP | 0.20 |
| Comparative Example 3 | A-11 | | — | 0 | R-4 | $6 \times 10^4$ | VP | 0.14 |
| Comparative Example 4 | A-11 | | — | 0 | R-5 | $3 \times 10^7$ | P | 0.39 |
| Comparative Example 5 | A-1 | | AOX-1 | 2 | R-4 | $7 \times 10^4$ | VP | 0.13 |
| Comparative Example 6 | A-1 | | AOX-1 | 2 | R-5 | $7 \times 10^4$ | P | 0.37 |
| Comparative Example 7 | A-4 | | AOX-2 | 2 | R-4 | $6 \times 10^4$ | VP | 0.11 |
| Comparative Example 8 | A-4 | | AOX-2 | 2 | R-5 | $7 \times 10^4$ | P | 0.38 |

TABLE 1-continued

| | Photosensitive Drum | | | | Charging Roller | | Image Evaluation *3 | |
|---|---|---|---|---|---|---|---|---|
| | | | Antioxidant | | | Resistance | Streak-Shaped | |
| | No. | Intermediate Layer | Type | Additive Amount *1 | No. | Value *2 [Ω] | Charge Unevenness | Image Density |
| Comparative Example 9 | A-7 | | AOX-3 | 2 | R-4 | $7 \times 10^4$ | VP | 0.13 |
| Comparative Example 10 | A-7 | | AOX-3 | 2 | R-5 | $6 \times 10^4$ | P | 0.39 |

*1 Parts by mass
*2 Measured under application of a DC voltage of 500 V in the low-temperature and low-humidity environment (10° C., 10% RH).
*3 Performed under the low-temperature and low-humidity environment (10° C., 10% RH).

As shown in Table 1, in Disclosure Examples 1 to 15, the photosensitive drums A-1 to A-9 in each of which any one of the antioxidants AOX-1 to AOX-3 was added to the electric charge transport layer and the charging rollers R-1 to R-3 each having a resistance value of $2\times10^5$ to $2\times10^6\Omega$ when a DC voltage of 500 V was applied thereto were used in combination, and these examples exhibited a very good result in that no streaks were observed at all on a halftone image. As also for the image density difference (ΔID), these examples exhibited a very good result with a value of not more than 0.15.

On the other hand, Comparative Example 1 using the photosensitive drum A-10 in which no intermediate layer was formed on the conductive substrate exhibited a poor result in that streaks were observed on a halftone image and also in that the image density difference (ΔID) had a value exceeding 0.15. Furthermore, in Comparative Examples 2 to 4 each using the photosensitive drum A-11 whose electric charge transport layer contained no antioxidant, streaks were observed on a halftone image regardless of a resistance value of the charging roller. Furthermore, in Comparative Examples 5 to 10 each using the charging roller R-4 or R-5 having a resistance value of not more than $2\times10^5\Omega$, streaks were observed on a halftone image even when there was used the photosensitive drum A-1, A-4, or A-7 whose electric charge transport layer contained an antioxidant. Moreover, Comparative Examples 2, 4, 6, 8, and 10 exhibited a poor result also in that the image density difference (ΔID) had a value exceeding 0.15.

The above-described results confirm that, when the photosensitive drums A-1 to A-9 in each of which any one of the antioxidants AOX-1 to AOX-3 is added to the electric charge transport layer and the charging rollers R-1 to R-3 having a resistance value of $2\times10^5$ to $2\times10^6\Omega$ when a DC voltage of 500 V is applied thereto under the low-temperature and low-humidity environment (10° C./10% RH) are used in combination, it is possible to effectively suppress streak-shaped charge unevenness on a halftone image and image density unevenness on a solid image.

The present disclosure is usable in an image forming apparatus employing the electrophotographic method. Through the use of the present disclosure, it is possible to provide an image forming apparatus capable of suppressing the occurrence of a streak-shaped charge unevenness image under the low-temperature and low-humidity environment.

What is claimed is:

1. An image forming apparatus, comprising:

an image carrier that includes a conductive substrate, an intermediate layer stacked on a surface of the conductive substrate, and a photosensitive layer stacked on a surface of the intermediate layer;

a charging roller that receives, while being in contact with a surface of the image carrier, application of a prescribed DC voltage and thus charges the surface of the image carrier;

an exposure device that exposes to light the surface of the image carrier charged by the charging roller so as to form an electrostatic latent image having attenuated charge thereon; and a developing device that supplies toner to the image carrier so as to develop the electrostatic latent image into a toner image, wherein the photosensitive layer includes an electric charge generation layer and an electric charge transport layer stacked on a surface of the electric charge generation layer, and the electric charge transport layer contains an antioxidant expressed by a general formula (1) below, and the charging roller has a resistance value in a range of $2\times10^5$ to $2\times10^6$[Ω] when a DC voltage of 500 V is applied thereto under an environment of 10° C. and 10% RH:

(1)

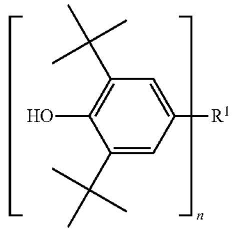

where in the formula (1), $R^1$ represents an alkyl group having 1 to 10 carbon atoms or a general formula (2) below in which $R^2$ represents an alkyl group having 1 to 10 carbon atoms:

(2)

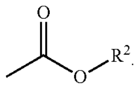

2. The image forming apparatus according to claim 1, wherein
the antioxidant is any one of compounds expressed by formulae (AOX-1) to (AOX-3) below:
(AOX-1)
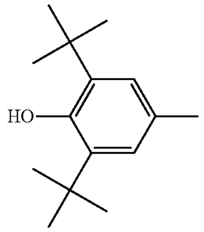
-continued
(AOX-2)
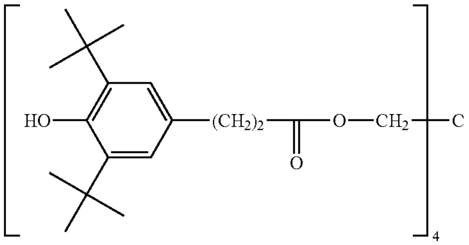
(AOX-3)
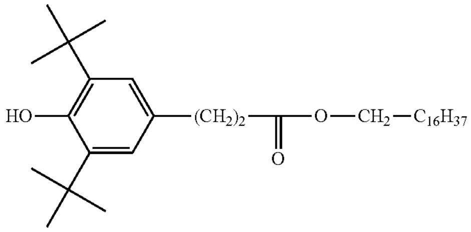
* * * * *